April 5, 1955     J. C. STREB ET AL     2,705,571
TRIM TRAY CONSTRUCTION FOR LIFT TRUCKS
Filed July 9, 1952     3 Sheets-Sheet 1

INVENTORS
Joseph C. Streb and
George B. Bole
BY
Frease & Bishop
ATTORNEYS

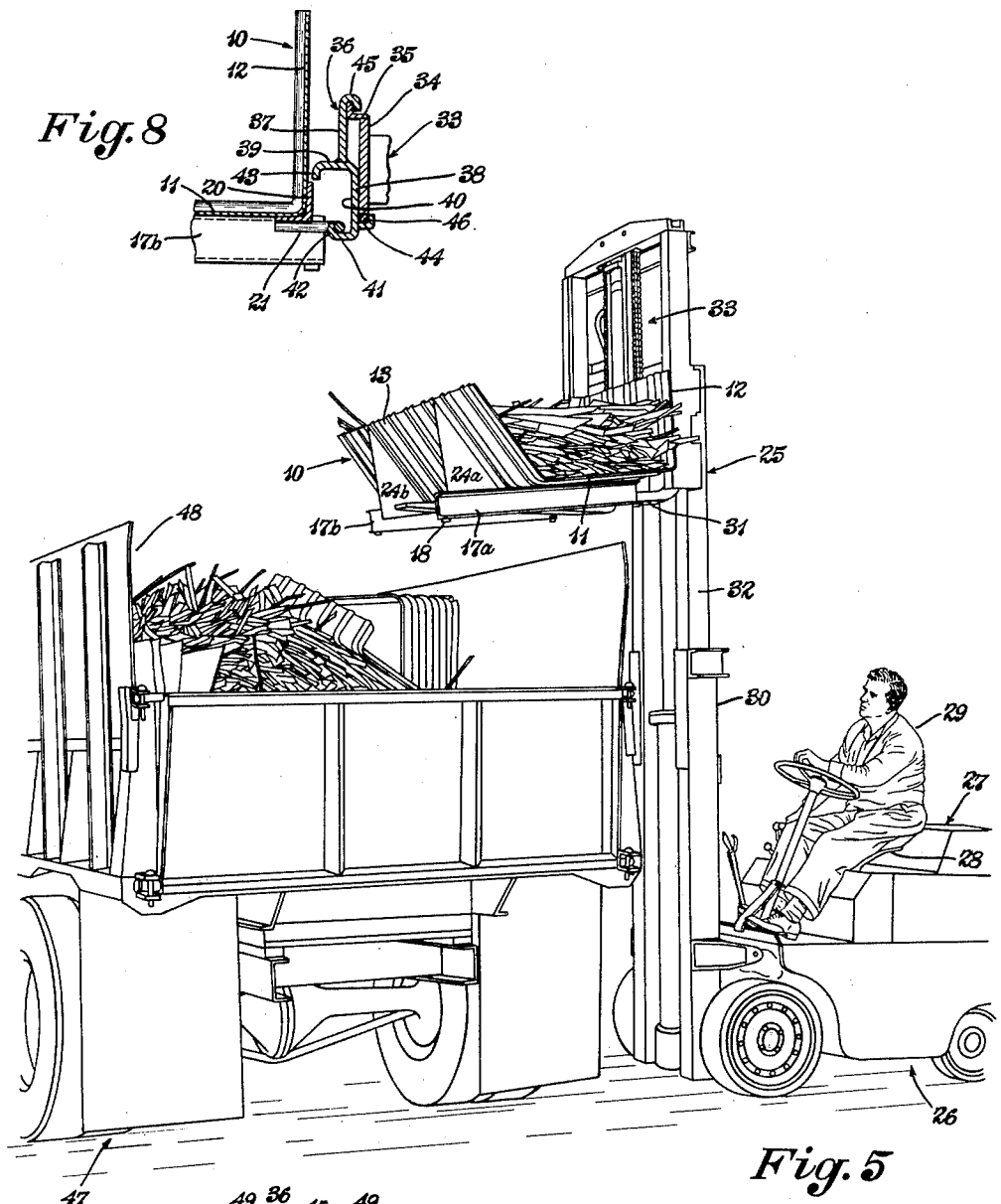

April 5, 1955  J. C. STREB ET AL  2,705,571
TRIM TRAY CONSTRUCTION FOR LIFT TRUCKS
Filed July 9, 1952  3 Sheets-Sheet 3
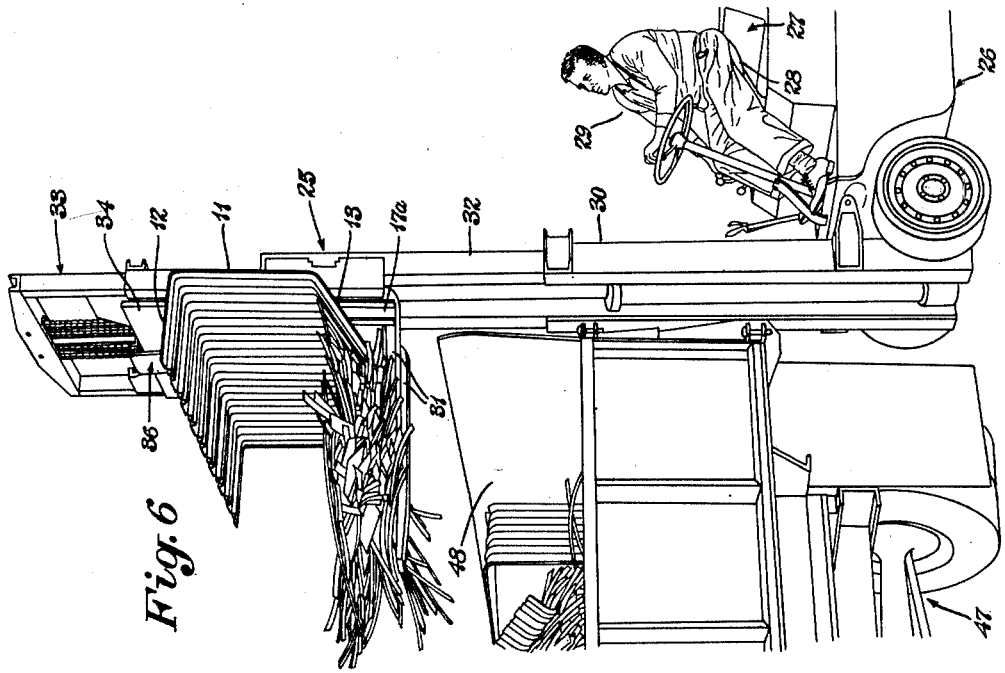
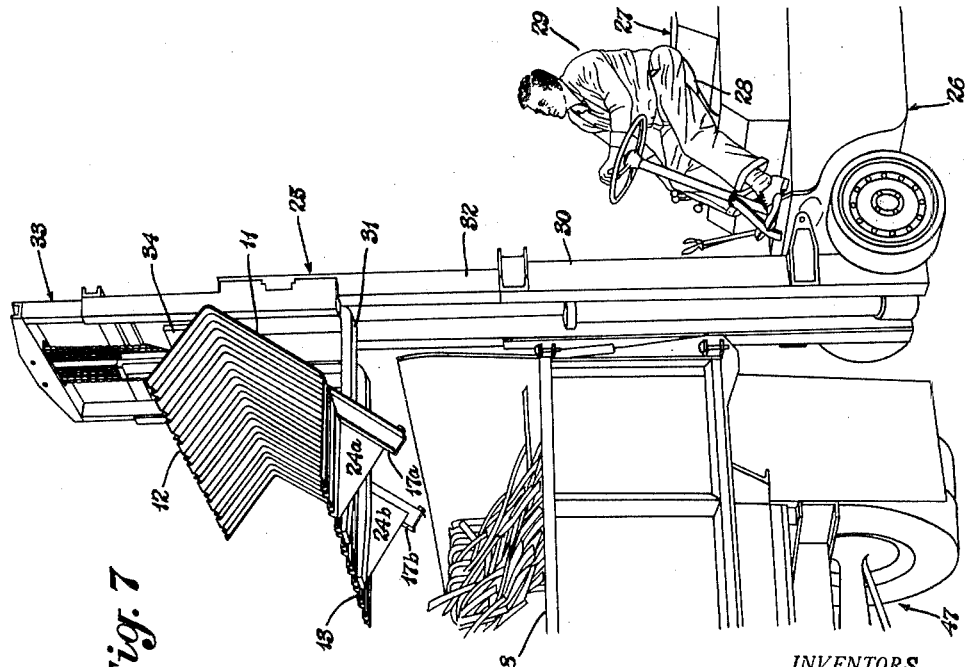
INVENTORS
Joseph C. Streb and
BY George B. Bole
Frease & Bishop
ATTORNEYS

United States Patent Office 2,705,571
Patented Apr. 5, 1955

2,705,571

TRIM TRAY CONSTRUCTION FOR LIFT TRUCKS

Joseph C. Streb and George B. Bole, Canton, Ohio, assignors to The Union Metal Manufacturing Company, Canton, Ohio, a corporation of Ohio Application July 9, 1952, Serial No. 297,924

4 Claims. (Cl. 214—315)

The invention or discovery relates to trim tray construction for lift trucks, and more particularly for fork lift trucks equipped with auxiliary dumping masts.

Trim trays are used for example for receiving scrap sheet metal trim delivered at the back of sheet metal shears as the result of shearing metal sheets to size. In a high production sheet metal manufacturing plant large quantities of such scrap trim are produced at each power shears, and must be removed from the scrap receival area at the back of the shears, and then transported to scrap storage or shipping as quickly and economically as possible.

At the scrap storage or shipping station, the scrap may be bundled or baled or it may be dumped directly into freight cars or street trucks; and it is desirable to dump scrap collected in a receptacle into the hopper of a baler or into a car or truck with minimum difficulty and expense.

Transportation of filled trim trays in the interior of the plant and to the exterior may be desirably effected by means of fork lift trucks. In a usual fork lift truck considerable difficulty is encountered in unloading the contents of a usual container carried by the fork lift truck into a hopper, freight car or truck.

It is furthermore desirable that trim trays be adapted for stacking to save floor space in the plant or elsewhere.

The objects of the present invention or discovery include the provision of an improved trim tray construction whereby each trim tray may be handled and combined with a fork lift truck, so as to constitute a loader adapted to elevate and empty the contents of the trim tray into the upwardly opening body of a hopper, car or truck.

A further object of the present invention or discovery is to provide such an improved trim tray construction, whereby a series of trays may be stacked.

A further object of the present invention or discovery is to provide such an improved trim tray construction having a simplified arrangement of parts, permitting economical manufacture and maintenance, and convenience in use.

The foregoing and other objects are attained by the trim tray construction for lift trucks, trim tray units, parts, combinations, and sub-combinations, which comprise the present invention or discovery, and the nature of which is set forth in the following general statement, and preferred embodiments of which are set forth in the following description, and which are particularly and distinctly pointed out and set forth in the appended claims forming part hereof.

The nature of the improved trim tray construction for lift trucks of the present invention or discovery may be stated in general terms as including a trim tray unit having a bottom wall, a back wall preferably perpendicular to the bottom wall, and a sloping front wall making an obtuse interior angle with the bottom wall. The bottom, back and front walls are preferably formed of one piece of sheet metal having transverse stiffening corrugations or ribs. The ends of the trim tray unit are open. The walls of the unit have equal lengths between the open ends, and the length of each wall is substantially greater than its width. The bottom wall is secured on the top of two parallel supporting and vertical spacing members which extend cross-wise of the bottom wall. The sloping front wall is preferably braced by two exterior gusset plates extending upwardly from the outer ends of the cross-wise supporting and vertical spacing members. The corner of the tray unit between the back wall and the bottom wall is preferably reinforced by an exterior fitting angle to which is secured a bail handle adapted for engagement by a hook member on the auxiliary mast of a fork lift truck.

By way of example, embodiments of the improved trim tray construction for lift trucks and component trim tray units of the present invention or discovery are illustrated in the accompanying drawings forming part hereof, in which.

Fig. 5 is a perspective view showing one of the filled trim tray units combined with a fork lift truck having an auxiliary mast, the trim tray unit being supported on the truck forks which have been elevated for dumping the contents of the trim tray unit into a street truck and the bail handle of the trim tray unit being connected with a hook member on the auxiliary mast prior to independent elevation of the auxiliary mast;

Fig. 6 is a perspective view similar to Fig. 5, showing independent elevation of the auxiliary mast of the fork lift truck, and the positioning of the bottom wall of the trim tray unit in a vertical plane, whereby the contents of the trim tray unit have commenced to dump out of the unit into the street truck;

Fig. 7 is a perspective view similar to Figs. 5 and 6, showing independent lowering of the auxiliary mast of the fork lift truck, and the forward positioning of the trim tray unit on the truck forks, whereby the contents of the trim tray unit are emptied from the unit and loaded into the street truck;

Fig. 8 is a fragmentary transverse sectional view showing the handle bail of the tray unit engaged with a hook member on the fork lift truck auxiliary mast; and Fig. 9 is a fragmentary front elevation of the auxiliary mast hook member.

Similar numerals refer to similar parts throughout the drawings.

Figure 3:
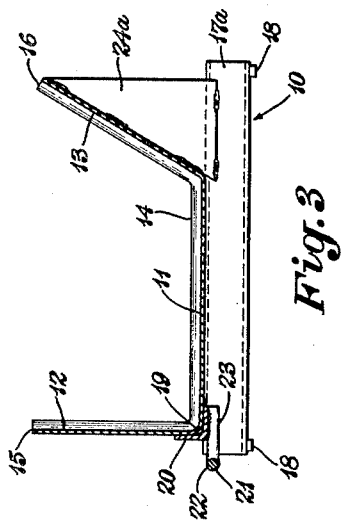
Fig. 3 is a transverse sectional view thereof on line 3—3, Fig. 1, looking in the direction of the arrows.
Figure 1:
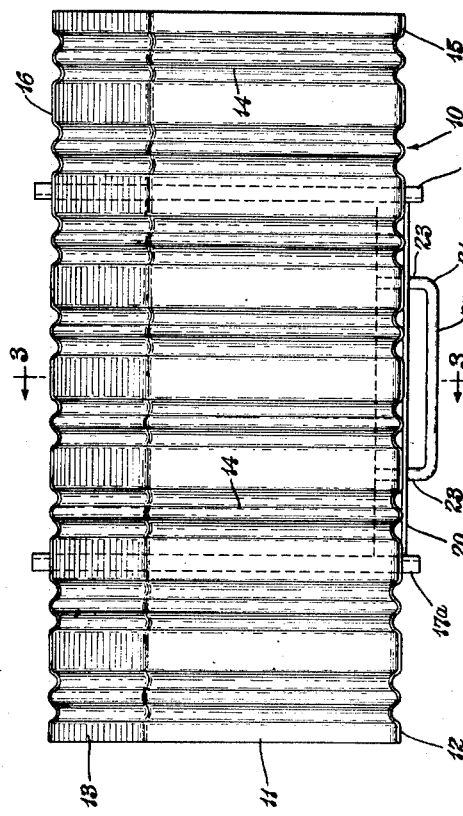
Figure 1 is a top plan view of a trim tray unit including the present improvements.
Figure 2:
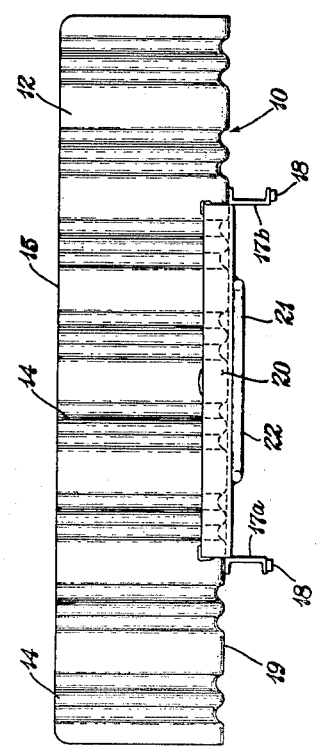
Fig. 2 is a back elevational view thereof.

A trim tray unit indicated generally by 10, and included in the present improved trim tray construction for lift trucks, is illustrated separately in Figs. 1, 2, and 3. The trim tray unit 10 includes a bottom wall 11, a back wall 12, and a front wall 13. The back wall 12 is perpendicular to the bottom wall 11, and the front wall 13 slopes at an obtuse interior angle with the bottom wall 11.

The bottom wall 11, the back wall 12, and the front wall 13 are preferably formed, as shown, of one piece of sheet metal having transverse stiffening corrugations or ribs 14.

The trim tray unit 10 has open ends, and the walls of the unit have equal lengths between the open ends, the lengths of each wall being substantially greater than its width. The back wall 12 has an upper edge 15, and the front wall 13 has an upper edge 16, and the upper edges 15 and 16 lie in a plane parallel with the bottom wall 11 to provide for stacking the unit 10.

The trim tray unit 10 furthermore includes two parallel supporting and vertical spacing members 17a and 17b which are located below and secured to the bottom wall 11. The parallel members 17a and 17b extend cross-wise of the bottom wall 11, and are parallel with the parallel end edges of the walls of the unit. The members 17a and 17b are moreover equally spaced from the end edges of the walls of the unit, and thus form a central median plane of the unit parallel with the end edges.

As shown the members 17a and 17b are channels each having a web, and upper and lower flanges extending towards the ends of the trim tray unit 10. The upper flanges of the channel members 17a and 17b preferably as shown are in abutment with the under face of the bottom wall 11.

The spacing between the webs of the channel members 17a and 17b is such as to permit easy entrance therebetween of the forks of a fork lift truck when the trim tray unit 10 is standing on a floor, and the channel webs have a height such as to vertically space the bottom wall 11 above the floor level so as to permit easy entrance of the forks of the fork lift truck below the bottom wall 11.

Figure 4:
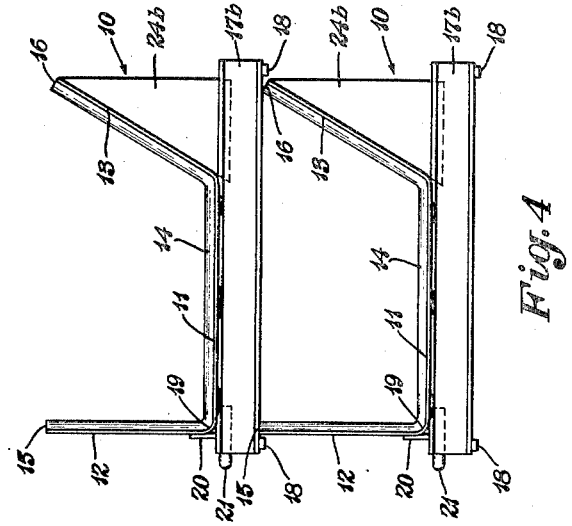
Fig. 4 is an end elevational view of a stack of two of the trim tray units of Figs. 1 to 3, inclusive.

Preferably as shown, at each outer end of the under face of each lower flange of each channel member 17a and 17b, there is secured a stop foot 18. When the tray units 10 are stacked, as in the stack of two tray units shown in Fig. 4, the feet 18 on each upper unit in the stack provide stops against sliding of the upper tray unit cross-wise on the supporting tray unit next below.

The tray unit 10, furthermore as shown is preferably reinforced at its lower corner 19 between the bottom wall 11 and the back wall 12. For this purpose, an angle bar 20 extends between the channel members 17a and 18a. One leg of the angle bar abuts the under face of the bottom wall 11, and the other leg of the angle bar abuts the outer face of the back wall 12. The interior corner between the legs of the angle bar 20 fits the exterior corner 19 of the tray unit 10, and the angle bar legs are secured to the bottom wall 11 and back wall 12.

Furthermore for the purposes of the present improvements, a bail handle 21 is secured to the under face of the bottom leg of the angle bar 20. As shown the bail handle 21 is formed of rod and has a U shape including an elongated central catch bar 22 from each end of which extend connector legs 23. The catch bar 21 is spaced outwardly from the tray unit corner 19, and the connector legs extend beneath and are secured to the bottom leg of the angle bar 20.

The sloping front wall 13 of the tray unit 10 is preferably provided with brace members connected to and extending between the front ends of the cross-wise supporting and vertical spacing members 17a and 17b and the front wall. As shown the brace members are triangular gusset plates 24a and 24b, the edges of the lower shorter legs of which are connected with the webs of the channel members 17a and 17b, respectively. The hypotenuse edges of the gusset plates 24a and 24b are connected with the outer face of the front wall 13.

In the tray unit 10 as shown and preferably, the parts are connected by arc welds. When desired, other forms of connections may be used. The bottom wall 11, the back wall 12, and the front wall 13 may be otherwise described as forming a tray shell, or an open ended container which is scoop-like. The members 17a and 17b may be more broadly termed supporting and vertical spacing means, which may be fabricated assemblies, or may be sets of leg members at each side of the transverse median plane of the tray shell.

In Figs. 5 to 8 inclusive, there is shown the combination of one of the tray units 10 with an auxiliary mast equipped fork lift truck, so as to constitute a loader apparatus, which also may be termed a dump scoop apparatus. Hereinafter the term "loader apparatus" will be used for convenience in identifying the combination.

The loader apparatus shown in Figs. 5, 6, and 7, is indicated generally by 25, and includes an auxiliary mast equipped fork lift truck indicated generally by 26, combined with one of the tray units 10. The auxiliary mast equipped fork lift truck 26 is of known construction and includes a self-propelled lateral transport unit 27 which has a front operator's seat 28 on which an operator 29 sits and operates the controls of the entire loader apparatus 25, these controls being in front of the operator.

At the front end of the transport unit 27, there is operatively mounted an auxiliary mast equipped fork lift unit 30, which includes forwardly extending lift forks 31 and main lift means 32 connected with the lift forks for raising and lowering the same. The lift unit 30 also includes auxiliary mast or lift means 33 having a front pad or plate 34, best shown in Figs. 8 and 9, which may be raised and lowered independently of the raising and lowering of the lift forks 31.

An angle member 35 projects outwardly from the top central portion of the plate 34 forming the normal or usual hook means on the auxiliary mast 33 for engaging a bottom dump box when the fork lift unit 30 is used to handle and dump bottom dump boxes.

For the purposes of the present invention the auxiliary mast hook means must be located relatively lower on the auxiliary mast 33 for manipulating the tray unit 10 by engagement with the bail handle 21 thereof. Accordingly, we have provided an auxiliary hook member generally indicated at 36 comprising an upper hook-shaped suspending member 37 and a lower tray engaging hook member 38 (Fig. 8). The tray engaging member 38 includes a top wall 39, a rear wall 40, a forwardly angled bottom wall 41, terminating in an upturned hook wall 42, and a downturned hook flange 43 is formed at the front edge of the top wall 39. Projecting rearwardly from the rear wall 40 is an angle member 44 spaced below the hook portion 45 at the top end of the suspending member 37.

A rod 46 approximately the same length as the angle member 35 in accordance with the present invention is welded to the bottom edge of pad 34 so that auxiliary hook member 36 may be laterally slidably mounted on and supported by pad 34 by movement of hook portion 45 over main hook angle member 35 and engagement of angle 44 under rod 46 (Figs. 8 and 9). The auxiliary hook member 36 when so mounted on pad 34 may be held in mounted position by pins 49 secured in holes formed in the angle member 35 at either side edge of auxiliary hook member 36 as shown in Fig. 9.

The normal procedure in using the improvements of the present invention is as follows:

An empty tray unit 10 may be located at the back of a power shears for receiving scrap trimmings from the shears as sheet or plate metal is being sheared thereon. This tray unit may be transported from any place of origin, such as a stack or tier of tray units, to the shears by a fork lift unit 30 in the usual manner.

When the tray unit 10 is filled with a load of scrap trimmings, and it is desired to convey the same to a scrap storage station or to a street truck or railroad car for shipment, the tray unit 10 is picked up in the usual manner on the lift forks 31 of the fork lift truck 30, which lift forks 31 are extended between the channel members 17a and 17b and below the tray unit bottom wall 11. The loaded tray unit 10 may then be transported in the usual manner, for instance, to the street truck 47, having an upwardly opening high walled body 48.

The lift forks 31 may then be elevated to lift the loaded tray unit 10 to a position above the top of street truck body 48. Prior to this operation the auxiliary lift means 33 is manipulated to engage the tray engaging hook member 38 with the bail handle 21 of the tray unit as shown in Fig. 8. This hook engaging operation normally is performed when the loaded tray unit 10 is first picked up by the lift forks 31.

The member 43 of the auxiliary hook member 36 serves the function of providing a safety catch limiting upward movement of the bail handle 21 which may result if the tray unit 10 should tip because of an unusually heavy distribution of the scrap load in the front portion of the tray unit 10.

Now, with the transport unit 27 located adjacent the street truck 47 and with the loaded tray unit 10 on the lift forks 31 thereof raised to a position above the top of truck body 48, and with the bail handle 21 engaged by the auxiliary hook member 36, the transport unit 27 is operated to move the lift forks 31 and tray unit 10 supported thereon over the open top of the street truck body 48.

The relative positions of the parts of the loader apparatus 25 and the truck 47 at this time are shown in Fig. 5 with the loaded tray unit 10 positioned thereon, which may be termed a "second" position, the first or "initial" position being the position of the tray unit at the receiving station behind the shears, or at a loaded tray scrap storage station.

Now, referring to Fig. 6, the auxiliary lift means 33 has been independently operated to a "third" position from the second position shown in Fig. 5, to elevate the corner 19 of the tray unit 10 accompanied by sliding the bottom wall 12 of the tray 10 on the lift forks 31 inwardly as shown. In this third position, the tray unit bottom wall 11 is vertical, and the front wall 13 slopes downwardly. During movement of the tray unit 10 from the second to third position, the scrap load therein slides out of the tray onto the forward end of the lift forks 31, some of it dropping to the street truck body 48.

The tray unit 10 next is lowered to the "fourth" position shown in Fig. 7, by independent lowering of the auxiliary lift means 33 which slides the front parts of the tray unit 10 outwardly on the lift forks 31. During the movement of the tray unit 10 from the third to fourth positions, all of the scrap trimmings remaining on the lift forks 31 are pushed off the outer ends thereof into the truck body 48.

After thus unloading the scrap from the tray unit 10 into the truck, the loader apparatus may be backed away from the truck and further lowering of the auxiliary lift means 33 returns the empty tray unit 10 to the second position. The fork lift truck 26 may then be manipulated to lower the forks and return the tray unit 10 to a tray storage location or to a receiving station behind a shears where the fork lift 26 is operated to stand the empty tray unit on the floor or on a stack of similar trays.

During the sliding movement of the tray unit 10 on the lift forks 41 from the second to the third and fourth positions, and return, the lift forks 41 remain stationary and the tray unit 10 is securely anchored against sidewise sliding or tipping by the engagement of the bail handle 21 with the auxiliary hook member 36. However, during these sliding movements of the tray unit 10 on the lift forks 31, the tray unit rotates in opposite directions about an axis perpendicular to its transverse median plane.

From the foregoing description it will be observed that the open end tray construction permits scrap trimmings of substantial length and substantially longer than the tray unit 10 to be collected, transported and dumped with much greater facility than similar scrap is presently handled by usual means. Heretofore where scrap has been handled in tote boxes on lift trucks, scrap lengths longer than the width or length of the tote box had to be bent or cut up in shorter pieces before depositing the same in the tote box.

Accordingly, the present invention provides improved materials handling equipment for receiving, transporting and dumping scrap material and particularly the trimmings from a sheet or plate metal shearing operation; provides a construction which enables such scrap material to be received, transported and dumped into hoppers, freight cars, trucks, or the like with the use of a fork lift truck very quickly and economically; provides an improved trim tray construction which can be positioned, stacked or manipulated on a fork lift truck with ease; provides a loader apparatus in which a scoop-like unit may conveniently receive and handle long length material and be manipulated on a fork lift truck to rotate the same on a lateral axis; and provides an improved trim tray and fork lift combination of simple construction which may be operated with ease and which solves existing problems and eliminates existing difficulties in the art in a simple, effective and efficient manner to obtain the advantages and desiderata described.

In the foregoing description certain terms have been used for brevity, clearness and understanding; but no unnecessary limitations are to be implied therefrom beyond the requirements of the prior art, because such terms are used for descriptive purposes herein and not for the purpose of limitation, and are intended to be broadly construed.

Moreover, the description of the improvements is by way of example and the scope of the present invention is not limited to the exact details illustrated, nor to the specific devices shown.

Having now described the features, discoveries and principles of the invention, the construction, operation and use of a preferred embodiment thereof, and the advantageous, new and useful results obtained thereby; the new and useful parts, elements, constructions, arrangements, combinations and sub-combinations, and mechanical equivalents thereof obvious to those skilled in the art, are set forth in the appended claims.

We claim:

1. A tray unit for a loader apparatus and the like, the tray unit including a tray shell having a bottom wall provided with ends at opposite sides of a transverse median plane of the shell, the ends of the tray shell at opposite sides of the transverse median plane being open, a back wall on said tray shell extending perpendicularly from a rear corner connection from the bottom wall, a sloping front wall on the tray shell extending at an interiorly obtuse angle from the bottom wall, supporting and vertical spacing means connected with and extending beneath the exterior face of the bottom wall on opposite sides of said median plane including webs having supporting edges spaced below the bottom wall, and an interengaging member comprising a bail handle including a catch bar extending rearwardly from the bottom wall of the tray unit, and said interengaging member being adapted for separable connection with an interengaging lift member on the loader.

2. For use with loader apparatus having a lift unit provided with outwardly extending lift forks, main lifting means connected with the lift forks and operative to raise and lower the forks, and auxiliary lift means provided with a hook member operative for raising and lowering independently of the lift forks; a tray unit construction including a tray shell having a bottom wall provided with ends at opposite sides of a transverse median plane of the shell, supporting and vertical spacing means connected with and extending from beneath the exterior face of the bottom wall on opposite sides of said median plane, a bail handle projecting rearwardly from the rear edge of the tray bottom wall, and the auxiliary lift means hook member including an upwardly opening lift hook coupled with the tray bail handle; whereby the tray unit may be located above the lift forks with the shell bottom seated on the forks and the spacing means located laterally on either side of the forks with the bail handle having connection with the lift hook on the auxiliary lift, whereupon the tray unit may be raised and lowered so as to slide inwardly and outwardly on the lift forks and rotate about a moving axis perpendicular to the transverse median plane.

3. A tray unit for a loader apparatus and the like, the tray unit including a tray shell having a bottom wall provided with ends at opposite sides of a transverse median plane of the shell, the ends of the tray shell at opposite sides of the transverse median plane being open, a back wall on said tray shell extending perpendicularly from a rear corner connection from the bottom wall, a sloping front wall on the tray shell extending at an interiorly obtuse angle from the bottom wall, parallel supporting and vertical spacing members extending beneath the exterior face of the bottom wall on opposite sides of said median plane and parallel to the plane of said wall, parallel triangular brace members connected to the supporting members with one of their edges in alignment with and abutting the exterior face of the sloping front wall, an interengaging member extending rearwardly from the bottom wall of the tray unit, and said interengaging member being adapted for separable connection with an interengaging lift member on the loader.

4. A tray unit for a loader apparatus and the like, the tray unit including a tray shell having a bottom wall provided with ends at opposite sides of a transverse median plane of the shell, the ends of the tray shell at opposite sides of the transverse median plane being open, a back wall on said tray shell extending perpendicularly from a rear corner connection from the bottom wall, a sloping front wall on the tray shell extending at an interiorly obtuse angle from the bottom wall, parallel supporting and vertical spacing members extending beneath the exterior face of the bottom wall on opposite sides of said median plane and parallel to the plane of said bottom wall, parallel triangular brace members connected to the supporting members with one of their edges in alignment with and abutting the exterior face of the sloping front wall, and an interengaging member comprising a bail handle including a catch bar extending rearwardly from the bottom wall of the tray unit, and said interengaging member being adapted for separable connection with an interengaging lift member on the loader.

References Cited in the file of this patent

UNITED STATES PATENTS

| | | |
|---|---|---|
| 1,742,738 | Turner | Jan. 7, 1930 |
| 2,325,568 | Eaton | July 27, 1943 |
| 2,354,337 | Smith | July 25, 1944 |
| 2,357,548 | Randall | Sept. 5, 1944 |
| 2,445,038 | Riemenschneider et al. | July 13, 1948 |
| 2,606,680 | Herman | Aug. 12, 1952 |
| 2,639,829 | Dempster et al. | May 26, 1953 |